United States Patent
Miyagawa (10) Patent No.: US 6,502,187 B1
(45) Date of Patent: Dec. 31, 2002

(54) PIPELINE COMPUTER DIVIDING A VARIABLE-LENGTH DATA-HANDLING INSTRUCTION INTO FIXED-LENGTH DATA-HANDLING INSTRUCTIONS

(75) Inventor: Hiroshi Miyagawa, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,134

(22) Filed: Nov. 15, 1999

(30) Foreign Application Priority Data

Nov. 18, 1998 (JP) .......................................... 10-327385

(51) Int. Cl.⁷ .............................................. G06F 9/312
(52) U.S. Cl. ....................................................... 712/225
(58) Field of Search ................................ 712/225, 241, 712/300

(56) References Cited

U.S. PATENT DOCUMENTS

| | | | | |
|---|---|---|---|---|
| 4,103,329 A | * | 7/1978 | Davis et al. ................. | 712/300 |
| 5,404,473 A | * | 4/1995 | Papworth et al. ........... | 712/241 |
| 5,822,602 A | * | 10/1998 | Thusoo ......................... | 712/1 |
| 5,828,875 A | * | 10/1998 | Halvarsson et al. ........ | 712/241 |
| 6,032,252 A | * | 2/2000 | Petro et al. ................. | 712/233 |

FOREIGN PATENT DOCUMENTS

| JP | 59-22142 | 2/1984 |
|---|---|---|
| JP | 1-318118 | 12/1989 |
| JP | 2-189633 | 7/1990 |
| JP | 5-265755 | 10/1993 |

OTHER PUBLICATIONS

"Interface", CQ Publishing, Issue No. 249, Mar. 1, 1998, pp. 99–131, In Japanese.

* cited by examiner

*Primary Examiner*—William M. Treat
(74) *Attorney, Agent, or Firm*—Sughrue Mion, PLLC (57) ABSTRACT

The present invention provides a pipelined computer which processes variable-length data without using branch instructions for speedy execution of a variable-length data-handling software instruction. Upon receiving a variable-length data-handling instruction from an instruction supply unit 1, an instruction division unit 2 divides the instruction into a plurality of derived micro instructions that handle fixed-length data. A reservation station 5 sends the derived micro instructions to an execution unit 6 and a redundant instruction detection unit 9 in a sequence in which the derived micro instructions were generated during the division. The redundant instruction detection unit 9 monitors the remaining derived micro instructions. An instruction deletion control unit 8 deletes redundant micro instructions in the reservation station 5. An instruction end operation unit 7 sets the state of the redundant derived micro instructions in the reorder buffer 4 to "execution completed state".

8 Claims, 10 Drawing Sheets

PIPELINE COMPUTER DIVIDING A VARIABLE-LENGTH DATA-HANDLING INSTRUCTION INTO FIXED-LENGTH DATA-HANDLING INSTRUCTIONS

BACKGROUND OF THE INVENTION

The present invention relates to a pipelined computer, and more particularly to a pipelined computer executing variable-length data-handling instructions.

One of the known techniques for this is, for example, a method for executing load instructions repeatedly to implement variable-length data-handling instructions while checking data lengths on a micro instruction level. For example, assume an instruction pipeline such as the one shown in FIG. 8.

Figure 8:
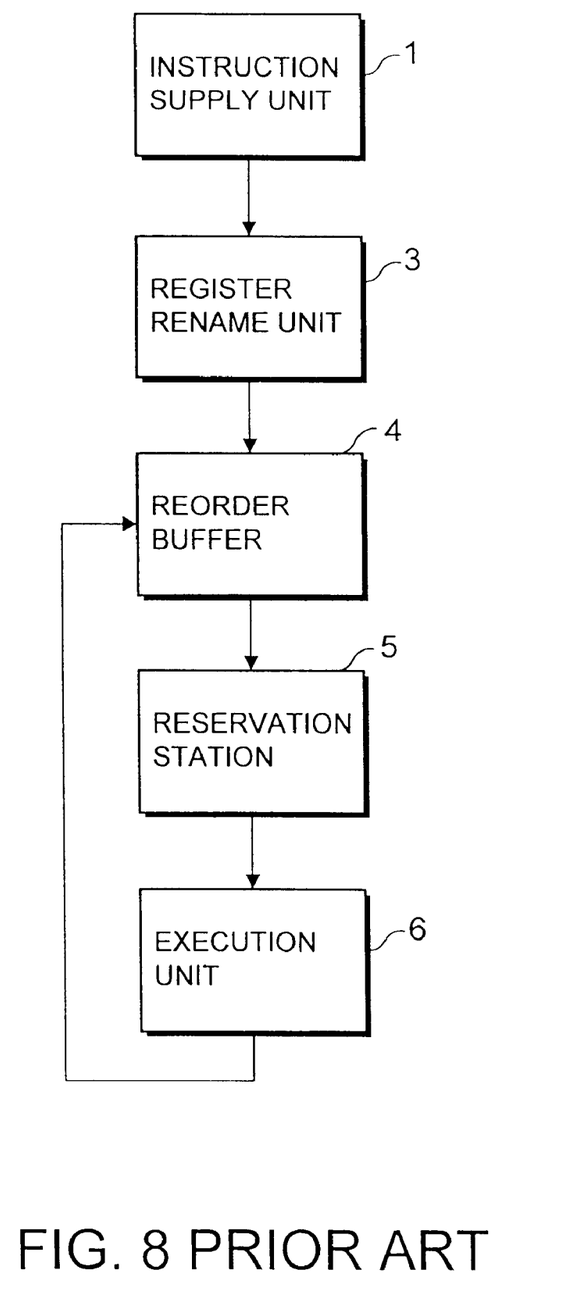
FIG. 8 is a diagram showing the configuration of a conventional pipelined computer.

An instruction supply unit 1 analyzes a software instruction fetched from main storage or instruction cache memory (not shown in the figure) and supplies a micro instruction corresponding to the software instruction. At this time, the instruction supply unit 1 appends an identifier (hereafter called "micro tag") to the micro instruction to identify it.

A register rename unit 3 checks if there is a register hazard (conflict) between the micro instruction sent from the instruction supply unit 1 and the preceding micro instructions. If necessary, the register rename unit 3 renumbers the resource register (register renaming) to prevent the register hazard.

A reorder buffer 4 stores therein the micro instructions sent from the register rename unit 3 until execution of the stored micro instructions are completed. The reorder buffer 4 also has two fields for each stored micro instruction: one is a field where the execution result of the stored micro instruction is stored and the other is a field where a flag indicating whether the execution of the stored micro instruction is completed is stored. Based on the contents of the execution completion field, the execution results of the completed micro instructions are written into software visible registers in the order in which the execution results were stored in the buffer (hereinafter, this write processing is called "graduate"). Upon completion of storing the execution result into the software visible register, the registered entry is released and the processing of the micro instruction is completed.

A reservation station 5 stores therein the micro instructions sent from the reorder buffer 4. A check is made for the resources to be used by the micro instructions in the buffer. Micro instructions whose resources are made available are sent sequentially to an execution unit 6 for execution. That is, from the reservation station 5, the micro instructions are sent to the execution unit 6 for execution, not in the order in which they were issued, but in the order in which required resources are made available.

The execution unit 6 executes a micro instruction received from the reservation station 5. When the execution of the micro instruction is finished, the execution unit 6 sends the execution result and execution completion notification to the reorder buffer 4 to inform that the micro instruction has been completed.

Figure 9:
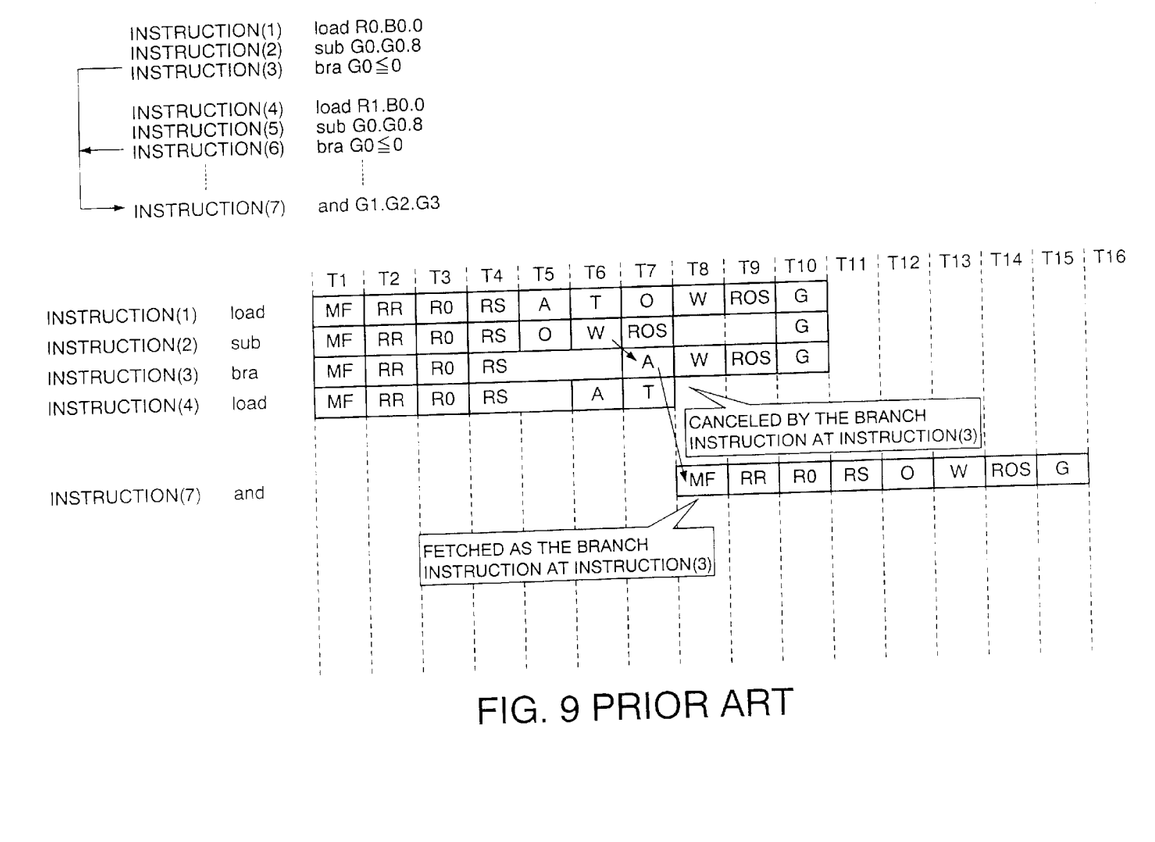
FIG. 9 is a timing diagram of conventional micro instruction coding.

FIG. 9 is the timing diagram of the instruction pipeline shown in FIG. 8. In the description below, assume that the system comprises one load/store unit, one register operation unit that performs register-to-register operation, and one branch unit. Assume that, from the time the instruction is fetched from memory to the time the execution result of the instruction is written into reorder buffer 4, the load store unit requires nine stages, the register operation unit requires seven stages, and that the branch unit requires six stages. Also assume that up to four instructions may be stored in the reorder buffer 4 at the same time and that up to four instructions may be graduated from the reorder buffer 4.

In FIG. 9, a micro instruction loads data from memory while calculating the data length. Each time the load instruction (load) loads data from memory, the subtraction instruction (sub) subtracts the length value of "8" from the data length to calculate the remaining data length. The branch instruction (bra) checks this remaining data length and, when it becomes "0" or smaller, ends the variable-length data processing and executes a branch. This operation is repeated for the maximum length of variable-length data. The and instruction is used to wait for the condition to be satisfied.

The four micro instructions fetched in T1 are register-renamed in T2 and stored in the reorder buffer 4 in T3. The micro instructions are stored in the reservation station 5 in T4 and then sent to the execution unit 6 in T5. The bra instruction at instruction (3) is put in the wait state in the reservation station 5 to check the execution result of the preceding sub instruction at instruction (2). In T6, when the execution result of the sub instruction at instruction (2) is determined, the bra instruction is sent to the branch unit.

When the bra instruction at instruction (3) sent to the branch unit detects that the operation result of the sub instruction at instruction (2) is "0", it fetches an instruction at the branch destination in T8. The and instruction at instruction (7), which is the instruction at the branch destination, is fetched in T8 and graduated in T15.

Because the conventional method described above performs data processing while checking the data length with the use of micro instructions, there are more pipe stages as the operation clock speed increases. Therefore, when a branch is "taken", it takes long to fetch the target instruction at the destination address. This means that, even if the operation clock speed is increased, the instructions require more clocks if there are many branch instructions, making it difficult to enhance instruction performance in proportion to the clock speed.

SUMMARY OF THE INVENTION

The present invention seeks to solve the problems associated with the prior art described above. It is an object of the present invention to provide a pipelined computer which is capable of handling variable-length data without having to use branch instructions and which increases the speed of a variable-length data-handling software instruction.

According to one aspect of the present invention, the pipelined computer according to the present invention comprises an instruction division unit which divides a variable-length data-handling instruction into a predetermined number of fixed-length data-handling instructions; and an execution unit which executes said fixed-length data-handling instructions, received from said instruction division unit, in a sequence of generation during the division.

BRIEF DESCRIPTION OF THE DRAWINGS

Other features and advantages of the invention will be made more apparent by the detailed description hereunder, taken in conjunction with the accompanying drawings, wherein.

DESCRIPTION OF THE PREFERRED EMBODIMENTS

An embodiment of the present invention will be described in detail by referring to the attached drawings.

Figure 1:
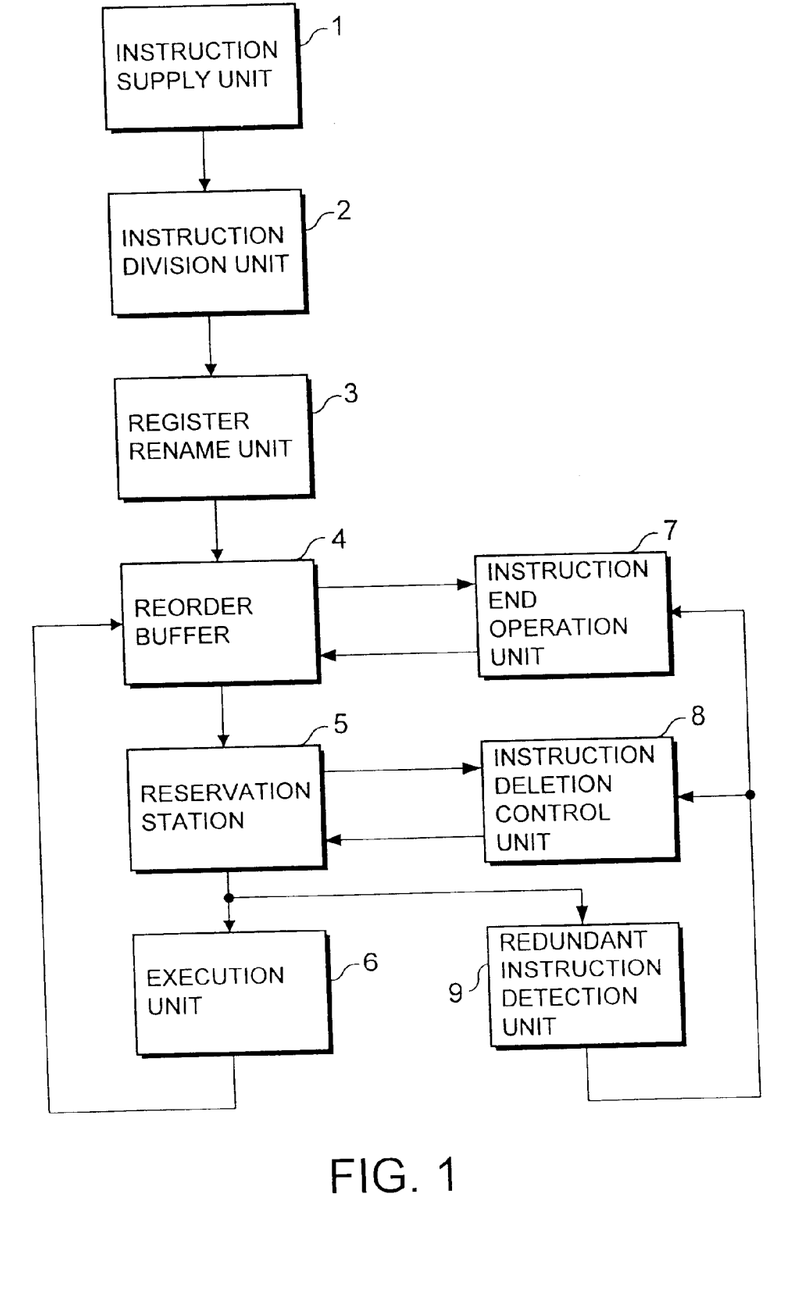
FIG. 1 is a diagram showing the configuration of a pipelined computer used in an embodiment of the present invention.
Figure 2A:
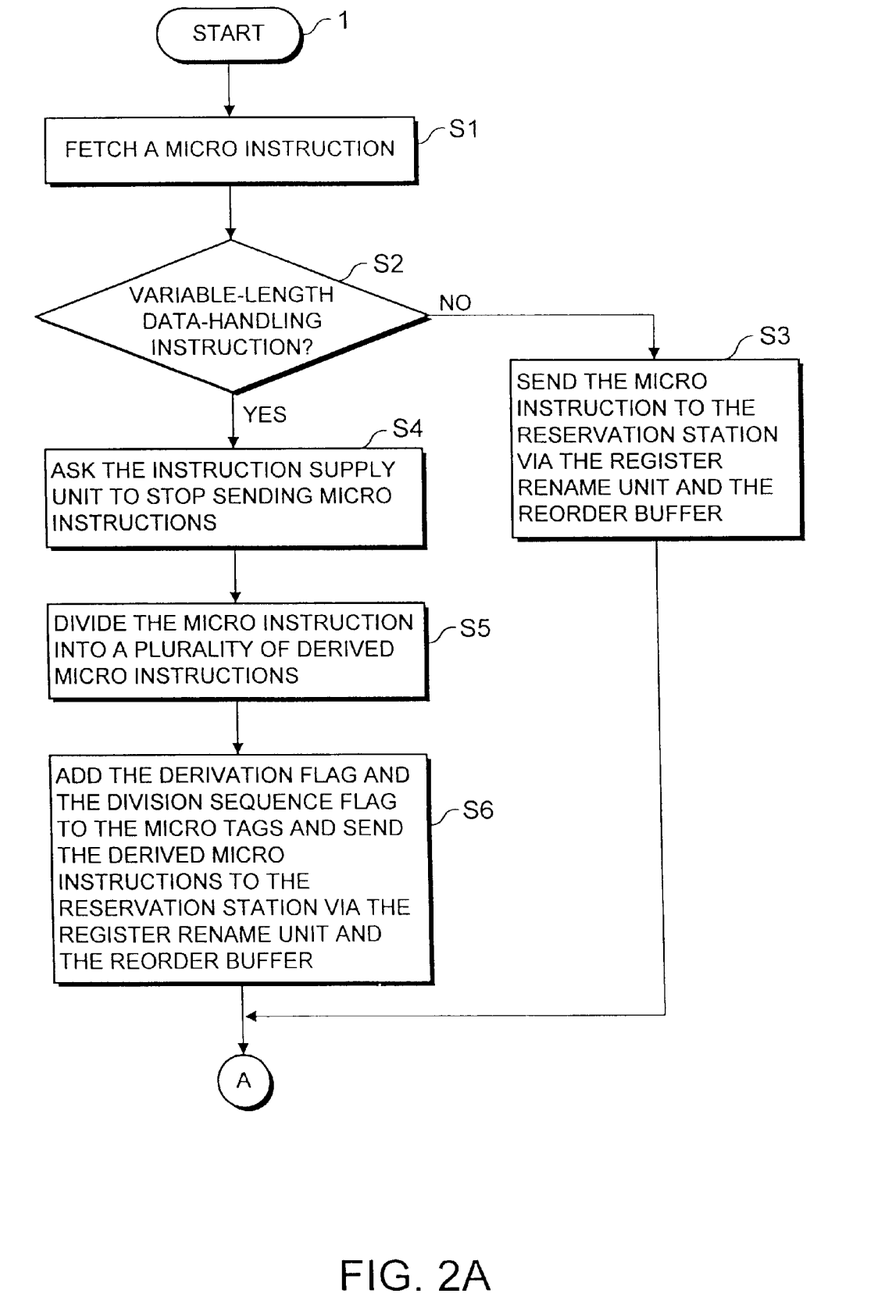
FIG. 2A and FIG. 2B are flowcharts showing the operation of the pipelined computer used in the embodiment of the present invention.
Figure 2B:
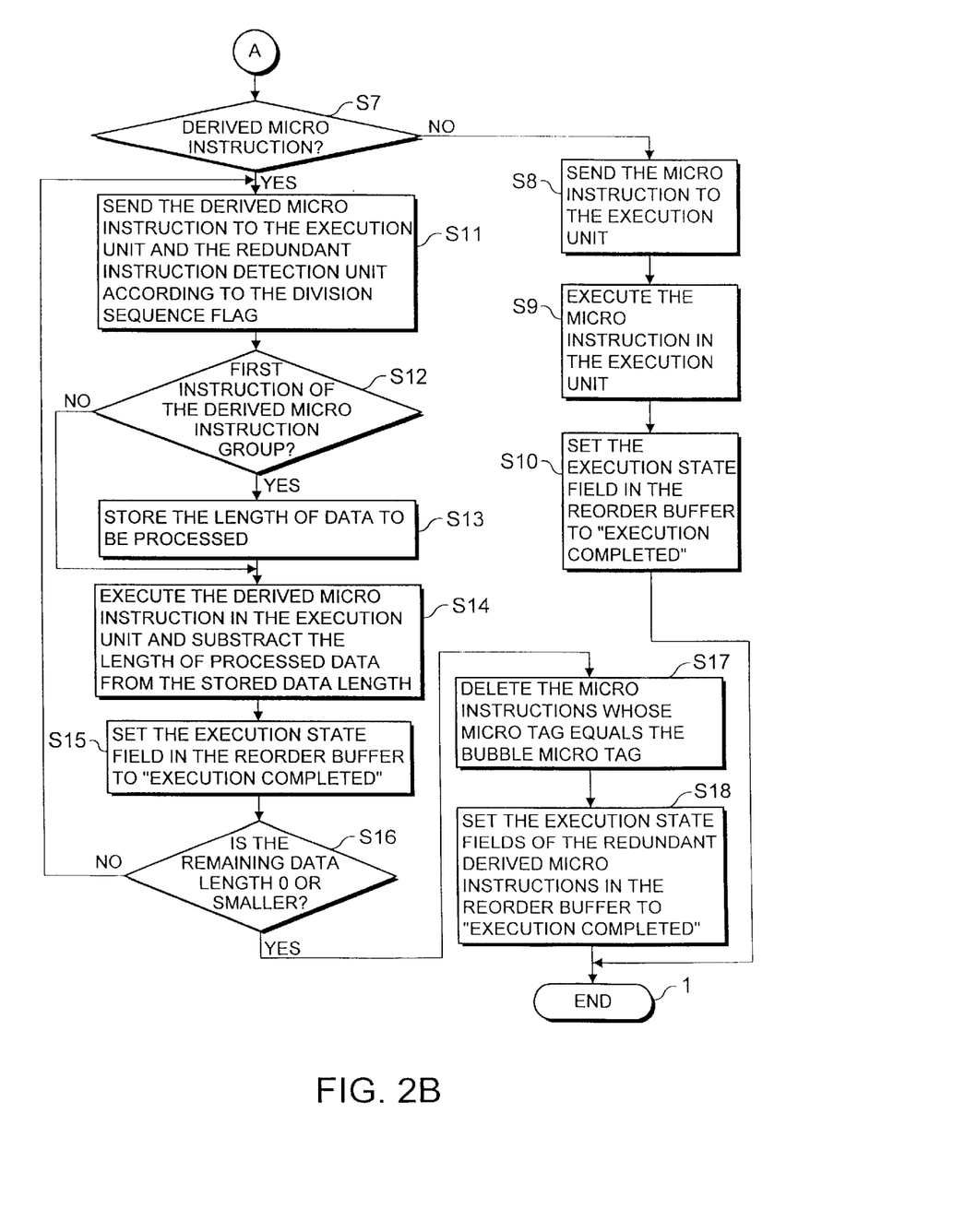

FIG. 1 shows the configuration a first embodiment of a pipelined computer according to the present invention. FIGS. 2A and 2B show the processing flow of the operation. An instruction supply unit 1 analyzes a software instruction fetched from main storage or instruction cache memory (not shown in the figure) and sends a micro instruction corresponding to the software instruction to an instruction division unit 2 (step S1 in FIG. 2A). At this time, the instruction supply unit 1 appends an identifier (hereafter called "micro tag") to the micro instruction to identify it.

When the instruction division unit 2 finds that the instruction received from the instruction supply unit 1 is not a variable-length data-handling micro instruction (step S2 in FIG. 2A), the instruction division unit 2 does not divide the instruction and sends it to a reservation station 5 via a register rename unit 3 and a reorder buffer 4 (step S3 in FIG. 2A).

On the other hand, when the instruction division unit 2 finds that the micro instruction received from the instruction supply unit 1 is a variable-length data-handling micro instruction (step S2 in FIG. 2A), the instruction division unit 2 asks the instruction supply unit 1 to stop sending instructions (step S4 in FIG. 2A). The instruction division unit 2 divides the variable-length data-handling instruction into a plurality of basic micro instructions that handle regular data lengths. It then sends them to the reservation station 5 via the register rename unit 3 and the reorder buffer 4 (steps S5 and S6 in FIG. 2A). In the following description, those basic micro instructions generated by the division are called "derived micro instructions".

The number of derived micro instructions is the quotient produced by dividing the maximum data length that can be handled by the variable-length data-handling instruction by the data length handled by a basic micro instruction. For example, when the variable-length data handling instruction accesses a maximum of 64 bytes of data and when the basic micro instruction accesses eight bytes of data, the variable-length data-handling instruction is divided into eight micro instructions. Note that, when the "quotient" is not an integer, it is rounded up to the next higher integer.

To the micro tag of each derived micro instruction, the instruction division unit 2 also adds a derivation flag indicating that the micro instruction is a derived micro instruction and a sequence flag indicating the sequence of generation during the division. For the micro tag, the derived micro instruction inherits the micro tag of the original variable-length data-handling micro instruction.

For an instruction that is not a variable-length data-handling instruction, the instruction division unit 2 invalidates the derivation flag and clears the sequence flag to "0". In the description below, the derivation flag and the sequence flag are collectively called an "extension tag".

The micro instruction with the micro tag and the extension tag added is sent from the instruction division unit 2 to an execution unit 6 and a redundant instruction detection unit 9 via the register rename unit 3, the reorder buffer 4, and the reservation station 5.

The reorder buffer 4 stores therein the instructions sent from the register rename unit 3 until their execution is completed. In this buffer, the sequence in which the instructions are received is maintained.

The reservation station 5 checks the extension tag of the micro instruction. If the reservation station 5 finds that the micro instruction is not a derived micro instruction (step S7 in FIG. 2B), it sends the micro instruction to the execution unit 6 (step S8 in FIG. 2B). The execution unit 6 executes the micro instruction (step S9 in FIG. 2B).

When the execution unit 6 completes the execution of the micro instruction, it sets the execution state field in the reorder buffer 4 to "execution completed" (step S10 in FIG. 2B) and ends the execution of the micro instruction.

On the other hand, if the reservation station 5 finds that the micro instruction is a derived micro instruction (step S7 in FIG. 2B), it sends the derived micro instruction to the execution unit 6 and the redundant instruction detection unit 9 in the sequence of generation during the division indicated in the sequence flag of the extension tag (step S11 in FIG. 2B).

The redundant instruction detection unit 9 checks each instruction issued to the execution unit 6. When the redundant instruction detection unit 9 finds, through the extension tag, that the first instruction of the derived micro instruction group was received (step S12 in FIG. 2B), it obtains from the instruction field the length of the data that would be processed by the original variable-length data-handling instruction and stores the data length into the data length register (not shown in the figure) (step S13 in FIG. 2B). Each time execution unit 6 executes a derived micro instruction with the same micro tag, the redundant instruction detection unit 9 subtracts the length of processed data (fixed length) from the data length register (step S14 in FIG. 2B).

The redundant instruction detection unit 9 checks the subtraction result. When the redundant instruction detection unit 9 finds that the remaining data length is "0" or smaller (step S16 in FIG. 2B), it sends the micro tag (hereinafter called "bubble micro tag") and the extension tag (hereinafter called "bubble extension tag") of the last micro instruction as well as the signal indicating that there at least one redundant micro instruction (hereinafter called "bubble indication") to an instruction end operation unit 7 and to an instruction deletion control unit 8.

Upon receiving the bubble indication and the bubble micro tag, the instruction deletion control unit 8 searches the reservation station 5 for the micro instructions each with the micro tag that equals the bubble micro tag. If there are such micro instructions, the instruction deletion control unit 8 deletes the matching micro instructions (redundant derived micro instructions) from the reservation station 5 (step S17 in FIG. 2B).

One the other hand, the instruction end operation unit 7 compares the bubble micro tag and the bubble extension tag with the micro tag and the extension tag of all the micro instructions stored in the reorder buffer 4 upon receiving the bubble indication, the bubble tag, and the bubble extension tag.

If, as a result of comparison, there are micro instructions, each with the micro tag that matches the bubble micro tag and with the extension tag that is larger than the bubble extension tag, the instruction end operation unit 7 determines that those micro instructions are redundant derived micro instructions and sets the execution state field of those derived micro instructions in the reorder buffer 4 to "execution completed" (step S18 in FIG. 2B).

Figure 3:
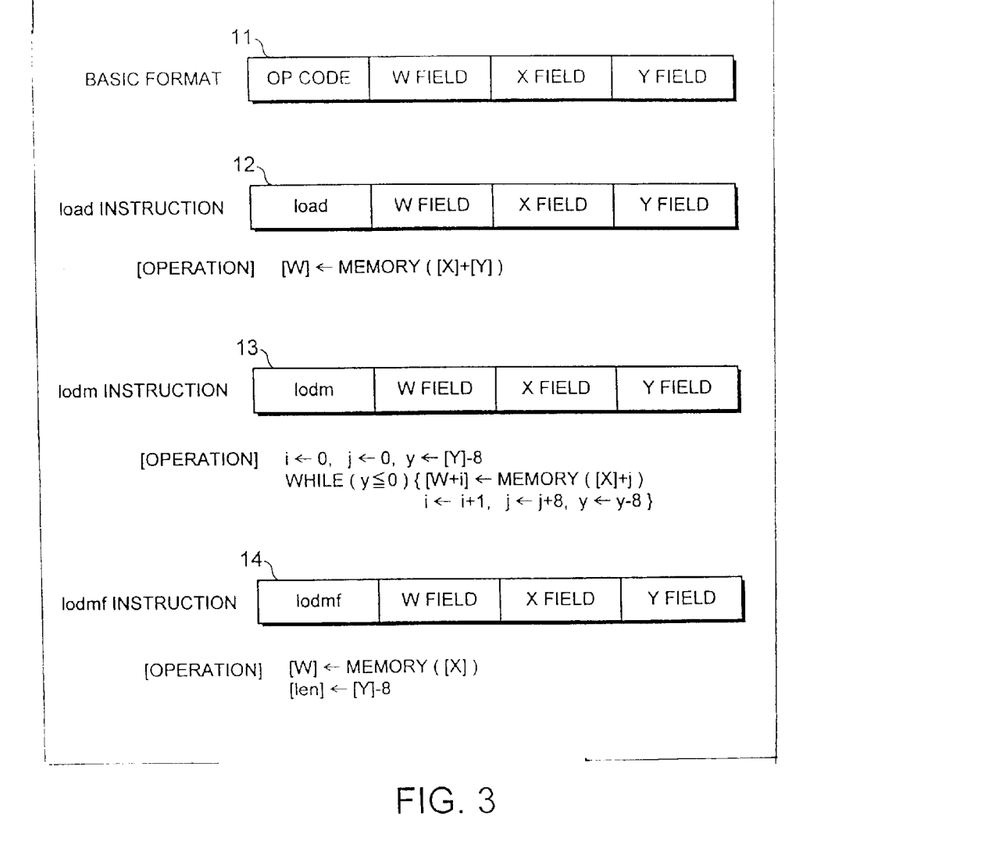
FIG. 3 is a diagram showing an example of micro instruction formats used in the embodiment of the present invention.

FIG. 3 shows the formats of the instructions used in the present invention. A basic format 11 comprises four fields: the W field specifying the number of the register in which the operation result is to be stored, the X field and the Y field specifying two operand registers (operation resources), and the OP code specifying the operation.

A load instruction 12, one of the basic instructions, adds the value stored in the index register specified by the Y field to the base address stored in the register specified by the X field and stores 8-byte data at the resulting memory address into the register specified by the W field.

On the other hand, a lodm instruction 13, one of the variable-length data-handling instructions, is a micro instruction capable of handling 1–64 bytes of variable-length data. This instruction loads data from the base address stored in the register specified by the X field for the length (1–64 bytes) stored in the register specified by the Y field into the consecutively-numbered registers beginning with the register specified by the W field.

A lodmf instruction 14 loads 8-byte data from the address stored in the base register specified by the X field into the register specified by the W field. Unlike the load instruction, the content of the register specified by the Y field of the lodmf instruction 14 is not used as an index register but is passed to the redundant instruction detection unit 9 for use in managing the data length of variable-length data.

Figure 4:
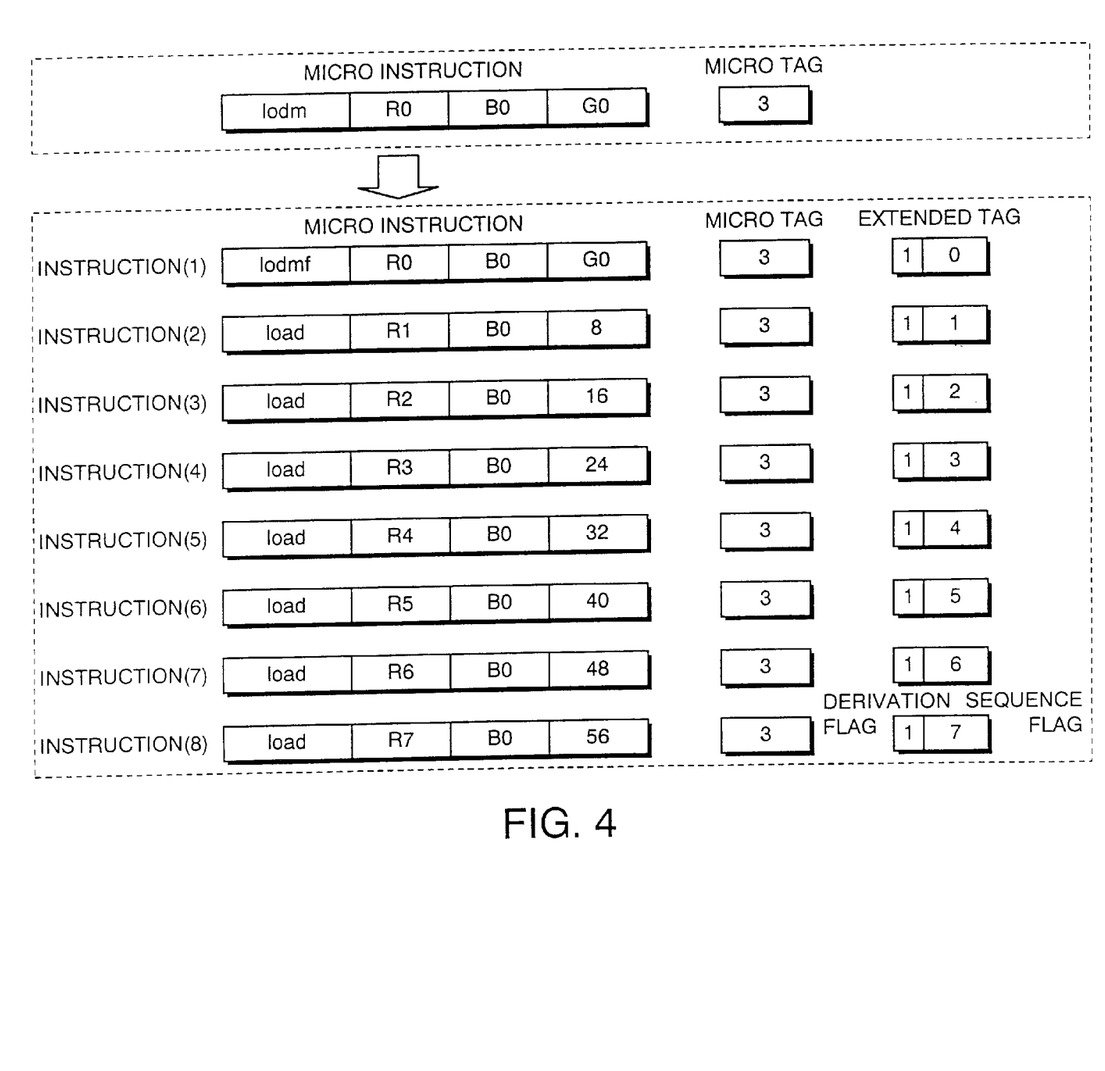
FIG. 4 is a diagram showing the derived micro instructions generated when an instruction division unit divides a variable-length data-handling instruction into basic micro instructions and the corresponding micro tags and extension tags.

FIG. 4 shows the derived micro instructions and the corresponding micro tags and extension tags generated when the instruction division unit 2 shown in FIG. 1 divides the variable-length data-handling instruction (lodm instruction) into basic micro instructions (load instruction The lodmf instruction at instruction (1) loads 8-byte data from the memory address stored in register B0 into register R0. From instructions (2) to (8), the register number in the W field is incremented by 1 and the index value is incremented by the fixed value of 8. That is, after execution of instructions (1) to (8), the 64-byte contiguous memory data beginning at the base address specified by register B0 is written into contiguous registers R0 to R7. These instructions produce the same result as the lodm instruction handling the maximum data length.

For the extension tags, the derivation flags are set to "valid" and the numbers "0" to "7" are sequentially assigned to the sequence flags of instructions (1) to (8).

So, eight derived micro instructions derived from the lodm instruction by the instruction division unit 2 are sent sequentially to the register rename unit 3 and are processed the same way normal micro instructions are processed.

The processing of a derived micro instruction is different from that of a normal micro instruction when it is output from the reservation station 5. The following describes the special operation that is performed when the derived micro instruction is output from the reservation station 5.

Referring to FIG. 1, when the lodmf instruction is sent to the redundant instruction detection unit 9 and the execution unit 6, the execution unit 6 executes the lodmf instruction to load data from memory into the register as described above. On the other hand, the redundant instruction detection unit 9 memorizes the micro tag and the extension tag, subtracts "8" from the contents of the register specified by the Y field that contains the length of the variable-length data, retains the result as the remaining data length, and checks if the subtraction result is "0" or smaller.

The subtraction result of "0" or smaller indicates that variable-length data processing concurrently being performed in the execution unit 6 has already ended. In this case, to invalidate the remaining redundant derived instructions following the lodmf instruction, the redundant instruction detection unit 9 sends the bubble indication and the bubble micro tag to the instruction deletion control unit 8 and, at the same time, sends the bubble indication, bubble micro tag, and bubble extension tag to the instruction end operation unit 7.

The subtraction result larger than "0" indicates that there is variable-length data to be processed. Therefore, the redundant instruction detection unit 9 retains the subtraction result produced by subtracting the length of "8" from the data length and waits for a derived micro instruction following the lodmf instruction to be sent from the reservation station 5.

After that, each time a derived micro instruction is sent from the reservation station 5, the redundant instruction detection unit 9 subtracts the length of "8" from the remaining length and checks if the subtraction result is "0" or smaller. If the subtraction result is "0" or smaller, the redundant instruction detection unit 9 invalidates the remaining derived micro instructions following the lodmf instruction; otherwise, the redundant instruction detection unit 9 updates the remaining data length and waits for the next derived micro instruction to be sent from the reservation station 5. However, when the redundant instruction detection unit 9 finds that the last derived micro instruction is sent from the reservation station 5 (the micro instruction whose division sequence field of the extension tag is "7"), it does not send the bubble indication to the instruction end operation unit 7 and the instruction deletion control unit 8 even if the subtraction result is "0" or smaller.

Figure 5:
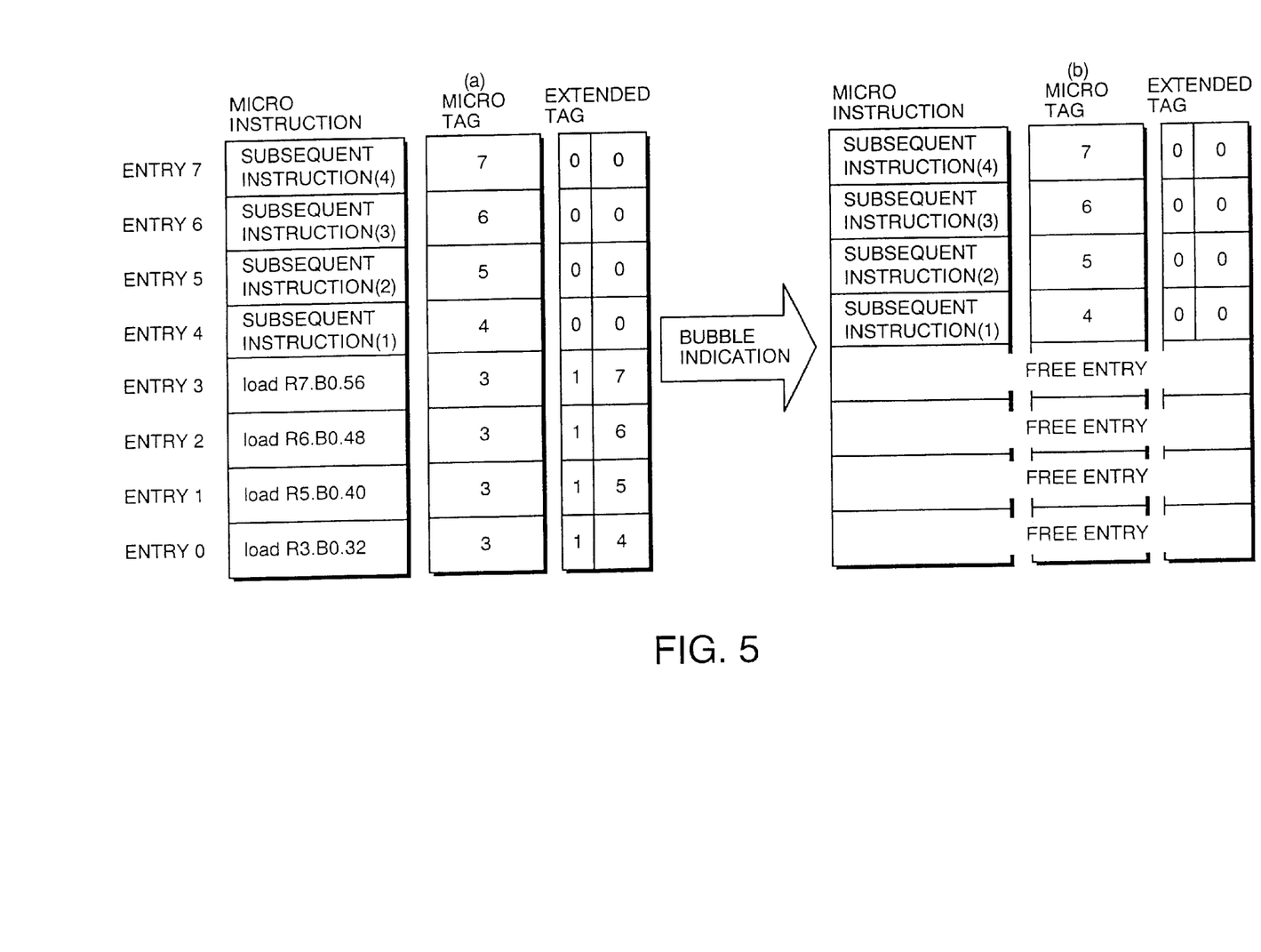
FIG. 5 is a diagram showing an example of processing performed when a bubble indication is issued.
Figure 6:
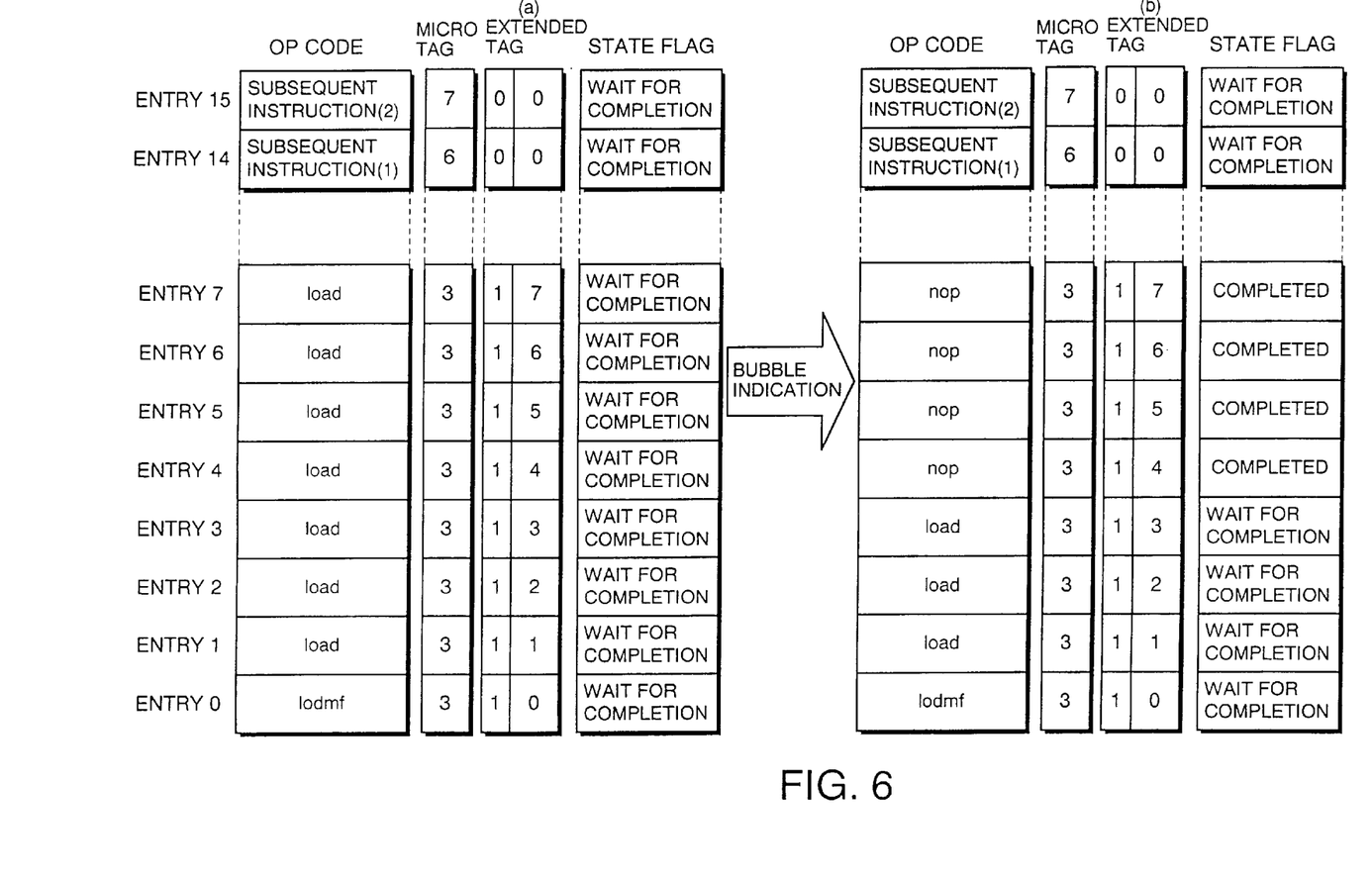
FIG. 6 is a diagram showing another example of processing performed when the bubble indication is issued.

FIGS. 5 and 6 show the operation that is performed in the instruction end operation unit 7, instruction deletion control unit 8, and redundant instruction detection unit 9. Referring to FIGS. 5 and 6, the following describes how redundant derived micro instructions are processed in the reservation station 5 and the reorder buffer 4 when the bubble indication is sent from the redundant instruction detection unit 9.

In the description below, assume that the reservation station 5 has "8" entries, the reorder buffer 4 has "16" entries, the variable-length data is "32" bytes long, and that the derived micro instructions, the micro tags, and the extension tags are generated as shown in instruction (1) to instruction (8) in FIG. 4.

The left side of FIG. 5 shows the contents of the reservation station 5 immediately after the derived micro instruction for processing the 8-byte variable-length data beginning at byte 24 of the variable-length data (instruction (4) in FIG. 4) is sent to the execution unit 6.

When the redundant instruction detection unit 9 sends the bubble indication and the bubble micro tag to the instruction deletion control unit 8 in this state, the instruction deletion control unit 8 searches the reservation station 5 for the entries with the micro tag that matches the bubble tag and finds that four entries, from entries 0 to 3, have the matching micro tag.

The micro instructions in the entries with the matching micro tag are redundant instructions that need not be processed. Therefore, the instruction deletion control unit 8 deletes them from the reservation station 5 to prevent them from being sent to the execution unit 6 or to free the entries used by those redundant micro instructions for use by other micro instructions. The right side of FIG. 5 shows the reservation station 5 from which the entries are deleted.

The left side of FIG. 6 shows the contents of the reorder buffer 4 immediately after the derived micro instruction for processing the 8-byte variable-length data beginning at byte 24 of the variable-length data (instruction (4) in FIG. 4) is sent to the execution unit 6.

When the redundant instruction detection unit 9 sends the bubble indication, the bubble micro tag, and the bubble extension tag to the instruction end operation unit 7 in this state, the instruction end operation unit 7 compares the bubble micro tag and the bubble extension tag with the micro tag and the extension tag of each of the entries in the reorder buffer 4.

If, as a result of this comparison, there is one or more entries whose micro tag matches the bubble micro tag and whose extension tag is larger than the bubble extension tag, the instruction end operation unit 7 determines that those micro instructions are redundant derived micro instructions. In the example shown in FIG. 6, the derived micro instructions in entries 4 to 7 are determined to be redundant micro instructions.

In the reorder buffer 4, the redundant derived micro instructions are forced to be set to the "execution completed state" and their operation codes are changed from "load" to "nop" to prevent the operation result from being written into the register at graduate time.

This operation prevents a stall condition which would be caused by an entry in the reorder buffer 4 waiting for the completion of a micro instruction already deleted from the reservation station 5. The operation also prevents a redundant derived micro instruction with no operation result from incorrectly updating the register.

As described above, the embodiment of the present invention executes a variable-length data-handling software instruction speedily without having to use branch instructions which would increase the execution time. Performance is therefore increased.

Next, an example of operation in the embodiment of the present invention will be described.

Figure 7:
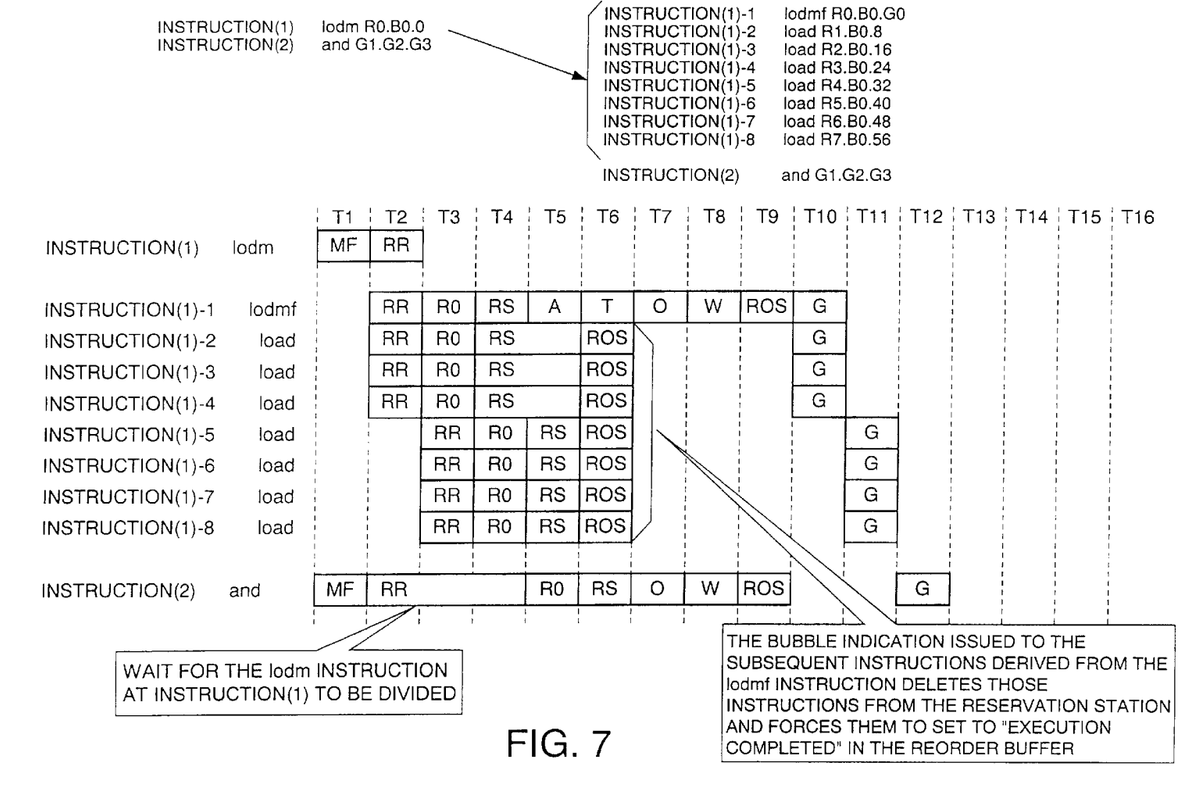
FIG. 7 is a timing diagram of micro instruction coding according to the embodiment of the present invention.

FIG. 7 is a timing diagram showing the operation of the embodiment of the instruction pipeline according to the present invention. In the following description, assume that the system comprises one load/store unit, one register operation unit that performs register-to-register operation, and one branch unit. Assume that, from the time the instruction is fetched from memory to the time the execution result of the instruction is written into reorder buffer 4, the load/store unit requires nine stages, the register operation unit requires seven stages, and that the branch unit requires six stages. Assume that up to four instructions may be stored in the reorder buffer 4 at the same them and that the up to four instructions may be graduated from the reorder buffer 4.

Assume that the instruction division unit 2 generates four derived micro instructions in one clock cycle. Also assume that the variable-length data used for creating the timing diagram is eight bytes long.

The lodm instruction at instruction (1), one of variable-length data-handling micro instructions, is divided into a total of eight instructions in the embodiment of the present invention: the lodmf instruction at instruction (1)-1 to the load instruction at instruction (1)-8. The and instruction at instruction (2) corresponds to the branch target instruction (7) used in the description of in the prior art.

Conventionally, register renaming is performed for the lodm instruction at instruction (1) and the and instruction at instruction (2) fetched in T1. However, in the embodiment according to the present invention, the derived micro instructions are generated for the lodm instruction at instruction (1) and the renaming of the and instruction at instruction (2) is delayed.

In T2, the lodm instruction at instruction (1) is divided into four instructions at the same time. In T3, the four derived micro instructions generated in T2 are stored in the reorder buffer 4 and, at the same time, the remaining four derived micro instructions are generated.

In T4, register renaming is performed for the registers to be used by the and instruction which has been delayed until the lodm instruction at instruction (1) is divided. In T5, when the redundant instruction detection unit 9 finds that, through the lodmf instruction at instruction (1) sent to the load/store unit, the remaining data length is "0" or smaller, it is determined that the instructions in the reservation station 5, from the load instruction at instruction (1)-2 to the load instruction at instruction (1)-8, are redundant instructions and that those instructions should be forced to end in the reorder buffer 4. In T6, the redundant instructions are deleted from the reservation station 5 and the corresponding entries in the reorder buffer 4 are set to the instruction end state.

After that, in T10 in which the lodmf instruction at instruction (1)-1 ends, graduate processing is started. The graduate processing of the and instruction at instruction (2) is performed in T12.

As mentioned, comparison between the operation in FIG. 7 with that in FIG. 9 indicates that variable-length data processing is performed more speedily.

In this embodiment, the instruction division unit 2, which finds a variable-length data-handling instruction, does not check the length of variable-length data but divides the instruction into a plurality of basic micro instructions required to process the maximum data length allowed for the variable-length data-handling instruction. Issuing these basic micro instructions speculatively allows variable-length data to be processed without having to issue branch instructions which would increase the execution time.

The redundant instruction detection unit 9 calculates the remaining length of variable-length data when each micro instruction generated by the instruction division unit 2 is executed in the execution unit 6. When data to be processed is exhausted, the redundant instruction detection unit 9 asks the instruction deletion control unit 8 and the instruction end operation unit 7 to discard the redundant micro instructions issued speculatively but not processed. Then, the instruction deletion control unit 8 deletes all the redundant micro instructions remaining in the reservation station 5, while the instruction end operation unit 7 sets the states of the redundant micro instruction in the reorder buffer 4 to "execution end state". This method allows variable-length data-handling data to be processed without having to use branch instructions, enabling a variable-length data-handling software instruction to be executed speedily and therefore increasing performance.

According to the present invention, issuing the number of derived micro instructions required to process the maximum length data of the variable-length data-handling instruction allows variable-length data to be processed without having to use branch instructions. This makes it possible for a variable-length data-handling software instruction to be processed speedily.

What is claimed is:

1. The pipelined computer, comprising:
    an instruction division unit which divides a variable-length data-handling instruction into a predetermined number of fixed-length data-handling instructions;
    an execution unit which executes said fixed-length data-handling instructions, received from said instruction division unit, in a sequence of generation during the division;
    wherein said instruction division unit adds a derivation flag and a sequence flag to each of said fixed-length data-handling instructions as an extension tag, the derivation flag indicating that the instruction is generated by the division, the sequence flag indicating the sequence of the instruction during the division, which further comprises:
        a redundant instruction detection unit which checks the instruction issued to said execution unit and, upon detecting through said extension tag that the instruction is the fixed-length data-handling instruction generated by the division and that a number of the fixed-length data-handling instructions required to process the data length handled by the original variable-length data-handling instruction have been executed, outputs said extension tag as a bubble extension tag.

2. The pipelined computer according to claim 1, wherein said predetermined number is a number produced by dividing a maximum data length handled by the variable-length data-handling instruction by the data length handled by said fixed-length data-handling instruction.

3. The pipelined computer according to claim 1, wherein said redundant instruction detection unit subtracts the data length handled by said fixed-length data-handling instruction from the data length handled by the original variable-length data instruction each time the fixed-length data-handling instruction is issued in order to detect that the number of the fixed-length data-handling instructions required to process the data length handled by the original variable-length data-handling instruction have been executed.

4. The pipelined computer according to claim 1, further comprising:
    a reservation station which stores therein the instructions not yet issued and from which said fixed-length data-handling instructions are issued in the sequence of generation during the division on condition that required operands of said instructions not yet issued are made available; and
    an instruction deletion control unit which deletes the instructions stored in said reservation station in response to the bubble extension tag output from said redundant instruction detection unit.

5. The pipelined computer according to claim 1, further comprising:
    a reorder buffer which maintains the sequence in which the instructions are generated by said instruction division unit during the division and in which the instructions are stored until execution completes; and
    an instruction end operation unit which sets the instructions maintained in said reorder buffer to an execution completed state in response to the bubble extension tag output from said redundant instruction detection unit.

6. The pipelined computer according to claim 1, further comprising:
    a reservation station which stores therein the instructions not yet issued and from which said fixed-length data-handling instructions are issued in the sequence of generation during the division on condition that required operands of said instructions not yet issued are made available;
    an instruction deletion control unit which deletes the instructions stored in said reservation station in response to the bubble extension tag output from said redundant instruction detection unit;
    a reorder buffer which maintains the sequence in which the instructions are generated by said instruction division unit during the division and in which the instructions are stored until execution completes; and
    an instruction end operation unit which sets the instructions maintained in said reorder buffer to an execution completed state in response to the bubble extension tag output from said redundant instruction detection unit.

7. A method for speeding up a software instruction, comprising:
    dividing a variable-length data-handling instruction into a predetermined number of fixed-length data-handling instructions;
    executing said fixed-length data-handling instruction in a sequence of generation during the division;
    subtracting a data length handled by said fixed-length data-handling instruction from the data length of the original variable-length data instruction each time the fixed-length data-handling instruction generated during the division is issued; and
    deleting the remaining fixed-length data-handling instructions when said subtraction result becomes equal to or smaller than "0".

8. A method for speeding up a software instruction, comprising:
    dividing a variable-length data-handling instruction into a predetermined number of fixed-length data-handling instructions;
    executing said fixed-length data-handling instruction in a sequence of generation during the division;
    subtracting a data length handled by said fixed-length data-handling instruction from the data length handled by the original variable-length data instruction each time the fixed-length data-handling instruction generated during the division is issued;
    setting the remaining fixed-length data-handling instructions to an execution completed state when said subtraction result becomes equal to or smaller than "0"; and
    deleting the remaining fixed-length data-handling instructions when said subtraction result becomes equal to or smaller than "0".

* * * * *